United States Patent [19]
Terada et al.

[11] 3,869,545
[45] Mar. 4, 1975

[54] PREPARATION OF ALUMINUM HYDRIDE
[75] Inventors: Kazuji Terada, Midland; Buddy L. York, Akron, both of Mich.
[73] Assignee: The Dow Chemical Company, Midland, Mich.
[22] Filed: Mar. 3, 1964
[21] Appl. No.: 349,795

[52] U.S. Cl. ............................................. 423/645
[51] Int. Cl. ............................................ C01b 6/00
[58] Field of Search ...................... 23/204; 423/645

[56] References Cited
UNITED STATES PATENTS

| | | | |
|---|---|---|---|
| 2,567,972 | 9/1951 | Schlesinger | 423/644 |
| 2,920,935 | 1/1960 | Finholt | 423/644 |
| 3,076,047 | 1/1963 | Seubold | 260/683.15 |

*Primary Examiner*—Leland A. Sebastian
*Attorney, Agent, or Firm*—C. Kenneth Bjork

EXEMPLARY CLAIM

1. In a process for preparing aluminum hydride by reacting an alkali metal aluminum hydride with aluminum chloride in an aliphatic ether solution the improvement which comprises; providing as the alkali metal aluminum hydride reactant a mixture of sodium aluminum hydride and lithium aluminum hydride in an aliphatic ether, the molar proportions of said sodium aluminum hydride-lithium aluminum hydride being about 5/1 to about 1/1, adding to said mixture over a period of from about 5 seconds to about 40 minutes while maintaining the reaction temperature below the boiling point of the ether aluminum chloride in an amount at a maximum of about 10 weight percent in excess of that required for stoichiometric reaction with said sodium aluminum hydride thereby to prepare aluminum hydride and co-precipitated inorganic halides and other impurities, dissolving said aluminum hydride in aliphatic ether solvent thereby freeing said aluminum hydride product from said co-precipitated inorganic halides and other impurities, and removing the co-precipitated solids from said aluminum hydride product solution.

4 Claims, No Drawings

PREPARATION OF ALUMINUM HYDRIDE

This invention relates to light metal hydrides and more particularly is concerned with a novel process for preparing aluminum hydride.

Conventionally aluminum hydride is prepared by reacting aluminum chloride with lithium aluminum hydride (LiAlH$_4$) in an aliphatic ether medium. The reaction is rapid and good yields of an etherated, i.e. ether solvated, aluminum hydride are realized. However, heretofore other alkali metal complex hydrides, e.g. sodium aluminum hydride (NaAlH$_4$) have not been used successfully as reactants in this process since no appreciable reaction rate between these and the aluminum chloride reactant has been realized.

A prime disadvantage of the traditional process is that lithium aluminum hydride is quite expensive. Additionally, although the solvated aluminum hydride product produced by the lithium aluminum hydride route readily can be converted into a substantially non-solvated particulate product of relatively large particle size having a characteristic hexagonal crystal structure as by the process set forth in copending application Ser. No. 234,275, filed Oct. 23, 1962, by D. L. Schmidt and R. W. Diesen, the substantially non-solvated product exhibits a tendency to undergo at least partial decomposition at elevated temperatures, e.g. about 60° C. and higher, over relatively short periods of time.

Now, unexpectedly a novel process employing a relatively inexpensive complex metal hydride reactant has been found which provides aluminum hydride in good yield and a rapid reaction rate.

It is a principal object of the present invention therefore to provide an improved and novel process for preparing aluminum hydride.

It is another object of the present invention to provide a novel and useful process for preparing an aluminum hydride material which upon subsequent conversion provides a substantially non-solvated crystalline product exhibiting unexpectedly high resistance to thermal degradation.

These and other objects and advantages readily will become apparent from the detailed description presented hereinafter.

The present invention comprises reacting sodium aluminum hydride with aluminum chloride in an inert solvent in the presence of lithium aluminum hydride as a reaction promoter.

In actual practice, particulate sodium aluminum hydride, preferably finely divided is mixed with lithium aluminum hydride in an aliphatic ether solvent, preferably diethyl ether, in molar proportions of sodium aluminum hydride/lithium aluminum hydride of from about 5/1 to about 1/1, preferably about 3/1. Aluminum chloride, ordinarily as an aliphatic ether solution of from about 0.25 to about 2 molar with respect to the aluminum chloride solute, at a maximum about 10 weight percent in excess of that required for stoichiometric reaction with the sodium aluminum hydride and preferably about the stoichiometric amount for reaction with the sodium aluminum hydride is added to the mixture of sodium aluminum hydride and lithium aluminum hydride in the ether. For optimum yields all reactants should be substantially anhydrous and all procedural steps are to be carried out in an inert, substantially anhydrous atmosphere.

Rapid addition of the aluminum chloride, i.e. over a period of from about 10 seconds to about 5 minutes and at reaction temperatures up to about the boiling point of the solvent produces rapid precipitation of a solvated aluminum hydride in the reaction mass.

Adding the aluminum chloride slowly over a period of from about 5 to about 40 minutes or more, preferably from about 10 to about 30 minutes at a maximum reaction temperature of about 30° C., preferably from about 0 to about 15° C. provides a high yield of aluminum hydride product wherein the product remains dissolved in the reaction solvent. Conveniently, this product solution can be used directly in the process of application Ser. No. 234,275 to produce directly a large sized particulate, solvent-free, hexagonal crystalline, aluminum hydride.

If the present process is carried out so as to precipitate solid, solvated aluminum hydride directly in the reaction medium, the resulting product can be recovered, as by selective extraction techniques, e.g. dissolution in an ether, to separate it from coprecipitated inorganic halides and other materials. The so-recovered aluminum hydride product can be used in solution form in the process of Schmidt and Diesen, described hereinbefore. Alternatively, if desired, the solid aluminum hydride etherate can be recovered by solvent removal. This latter product can be used to prepare a hexagonal, crystalline, substantially non-solvated aluminum hydride product in accordance with the process disclosed in patent application Ser. No. 179,510 by F. M. Brower et al or by other techniques for the production of such material from solvated aluminum hydride.

Aliphatic (including cycloaliphatic) ether solvents suitable for use in the present process are those having from 2 to about 8 carbon atoms. Illustrative examples of these ethers are the alkyl ethers; ethylene glycol dialkyl ethers and diethylene glycol dialkyl ethers having methyl and ethyl alkyl radicals; and cycloaliphatic ethers such as 1,4-dioxane, tetrahydrofuran, alkyl tetrahydrofuran such as methyl tetrahydrofuran and tetrahydropyran. Alkyl ethers, such as diethyl ether and n-dipropyl ether, are preferred. The concentration of lithium aluminum hydride dissolved in the solvent ranges from about 0.025 to about 1 molar or more.

The aluminum chloride can be used directly or employed as a solution. Ordinarily a diethyl ether solution of this reactant is used having an aluminum chloride concentration of from about 0.25 to about 2 molar although these concentrations are not critical.

The hexagonal, crystalline, substantially non-solvated aluminum hydride which can be prepared from the aluminum hydride material obtained in the present process is the aluminum hydride identified and characterized in copending application Ser. No. 234,277 by N. E. Matzek and D. F. Musinski filed Oct. 23, 1962 and that identified and characterized in copending application Ser. No. 179,509 by Matzek and Musinski filed Mar. 8, 1962.

The following Example will serve to further illustrate the present invention but is not meant to limit it thereto.

EXAMPLE

Finely ground sodium aluminum hydride (13.5 grams, about 0.25 gram mole NaAlH$_4$) was placed in a one-liter round-bottom flask with about 250 milliliters of about 0.3 molar lithium aluminum hydride (~0.075 gram mole LiAlH₄) solution in diethyl ether. This provided NaAlH₄/LiAlH₄ in molar proportions of about 3.3/1 in the reaction mixture.

The mixture was maintained at about 0° C. and about 75 milliliters of aluminum chloride-diethyl ether solution (~1 molar in AlCl₃) was added drop-wise over a period of about 15 minutes. The resulting mixture was stirred for about 5 minutes. X-ray diffraction analysis of the reaction residue showed no evidence of NaAlH₄ indicating complete conversion of the normally substantially unreactive sodium aluminum hydride.

In accordance with one embodiment of the process disclosed in patent application Ser. No. 234,275, about 75 milliliters of 1 Molar LiBH₄-diethyl ether solution (~75 millimoles of LiBH₄) was added to the ethereal product solution of aluminum hydride and lithium aluminum hydride reaction promoter plus solid sodium chloride thereby providing a solution having a LiAlH₄:AlH₃:LiBH₄ ratio of approximately 1:4:1. The resulting mixture was stirred for about 15 minutes and filtered into about 2300 milliliters of substantially anhydrous benzene in a 3000 milliliter round-bottom flask equipped with a thermowell and a fractionating column with a take-off head. This provided a substantially solid-free solution having a diethyl ether-benzene solvent in proportions of about 15:85.

The resulting clear solution in the 3000 milliliter flask was positioned in an oil bath preheated to about 90° C. Diethyl ether was fractionally distilled from the reaction mass over a period of about 2 hours. During this time, the reflux temperature of the reaction mixture rose from about 72° to about 79° C. at atmospheric pressure. Crystalline aluminum hydride started to form in the reaction mass about one hour after the heating was started. After heating for about 2 hours, the product mixture was removed from the reactor, cooled and the crystalline, solid, relatively large particles (about 10 microns or larger) of aluminum hydride were collected under substantially anhydrous conditions. This solid product was washed three times with diethyl ether and dried at about room temperature or pressure of about 0.1 millimeter mercury absolute.

X-ray diffraction analysis indicated the product was substantially aluminum hydride with a characteristic hexagonal crystal structure corresponding to that disclosed by Matzek and Musinski in application Ser. No. 179,509.

Elemental analysis indicated C, 0.16%; H, 9.97%; Al, 88.68%, Cl, 0.23%.

Calculated for AlH₃: H, 10.07%; Al, 89.93%.

The low carbon content and close agreement of the actual and calculated hydrogen analysis shows the product is substantially ether free.

The resulting non-solvated crystalline aluminum hydride product produced from the material produced by this present process and one prepared using lithium aluminum hydride as a reactant were found not to differ analytically.

Samples of hexagonal substantially non-solvated AlH₃ exhibiting the same X-ray diffraction pattern and infra-red absorption spectrum from both the present sodium aluminum hydride and conventional lithium aluminum hydride preparative procedures were placed in a Taliani gas evolution apparatus under a nitrogen atmosphere and the amount of gas evolution for the sample measured as a pressure increase in a constant volume at 60° C. was determined against time. The pressure increase in the system, indicative of aluminum hydride gassing and decomposition, was noted over a period of days.

This test, therefore, serves as a measure of the stability against degradation of the aluminum hydride at an elevated temperature.

The results of these thermal stability studies are shown in Table I which follows:

| AlH₃ Sample | Time on Test (Days) | Decomposition (Percent) |
|---|---|---|
| 1. From LiAlH₄ Process (Conventional) | 2<br>4<br>6 | 0.12<br>0.30*<br>0.90* |
| 2. From NaAlH₄ Process | 2<br>4<br>6<br>8<br>10 | 0.10,0.02,0.02**<br>0.15,0.05,0.03<br>0.17,0.15,0.05<br>0.30,0.25,0.10<br>0.45,0.38,0.18 |

* Rapidly increasing rate of decomposition
**Three samples

These results clearly demonstrate the improved elevated temperature stability of the crystalline non-solvated aluminum hydride product prepared using the aluminum hydride material of the present novel process.

In a manner similar to that described for the foregoing example, aluminum chloride is added over a period of about 10 minutes and a temperature of about 50° C., to a mixture of sodium aluminum hydride and lithium aluminum hydride in 1,4-dioxane, wherein the NaAlH₄/LiAlH₄ proportions were about 5:1. Aluminum hydride etherate precipitated directly in the reaction mass. This readily is dissolved by treatment with excess solvent thereby freeing the aluminum hydride product material from co-precipitated inorganic halides and other impurities and can be subsequently recovered as a solid or utilized directly in solution form.

Similarly aluminum hydride readily can be prepared in accordance with the present process by adding aluminum chloride to a reaction mixture of NaAlH₄/LiAlH₄ (at a molar proportion of about 1/1) in n-dipropyl ether.

Various modifications can be made in the present process without departing from the spirit or scope thereof for it is understood that we limit ourselves only as defined in the appended claims.

I claim:

1. In a process for preparing aluminum hydride by reacting an alkali metal aluminum hydride with aluminum chloride in an aliphatic ether solution the improvement which comprises: providing as the alkali metal aluminum hydride reactant a mixture of sodium aluminum hydride and lithium aluminum hydride in an aliphatic ether, the molar proportions of said sodium aluminum hydride-lithium aluminum hydride being about 5/1 to about 1/1, adding to said mixture over a period of from about 5 seconds to about 40 minutes while maintaining the reaction temperature below the boiling point of the ether aluminum chloride in an amount at a maximum of about 10 weight percent in excess of that required for stoichiometric reaction with said sodium aluminum hydride thereby to prepare aluminum hydride and co-precipitated inorganic halides and other impurities, dissolving said aluminum hydride in aliphatic ether solvent thereby freeing said aluminum hydride product from said co-precipitated inorganic halides and other impurities, and removing the co-precipitated solids from said aluminum hydride product solution.

2. The process as defined in claim 1 wherein the aluminum chloride is added over a period of from about 5 to about 40 minutes while maintaining the reaction temperature at a maximum of about 30° C.

3. The process as defined in claim 1 wherein sodium aluminum hydride and lithium aluminum hydride are carried in diethyl ether and are present in molar proportions of about 3/1 (NaAlH$_4$.LiAlH$_4$) and the aluminum chloride is added as a diethyl ether solution over a period of from about 10 to about 30 minutes while maintaining the reaction temperature at from about 0° to about 15° C. thereby to provide directly a solution of aluminum hydride in the reaction mass.

4. The process as defined in claim 3 and including the steps of separating the solution of said aluminum hydride from coproduced insolubles, adding a diethyl ether solution of lithium borohydride thereto to provide a solution having a LiAlH$_4$:AlH$_3$:LiBH$_4$ ratio of approximately 1:4:1, stirring the resulting mixture for at least about 15 minutes and filtering it into substantially anhydrous benzene to provide a solution having a diethyl ether-benzene solvent proportion of about 15 to 85, fractionally distilling diethyl ether therefrom while maintaining the reflux temperature at from about 72° to about 79° C. thereby crystallizing, solid, substantially non-solvated aluminum hydride having a characteristic hexagonal crystal structure directly in the benzene-diethyl ether solution.

* * * * *